United States Patent
Chen

(10) Patent No.: US 10,443,593 B2
(45) Date of Patent: Oct. 15, 2019

(54) FRESH WATER TRANSPORT METHOD UTILIZING ANCHORED BUOYANT UNITS POWERED BY THE CHANGING HEIGHT OF A LOCAL TIDE

(71) Applicant: Walter Chen, Oakland, CA (US)

(72) Inventor: Walter Chen, Oakland, CA (US)

( * ) Notice: Subject to any disclaimer, the term of this patent is extended or adjusted under 35 U.S.C. 154(b) by 144 days.

(21) Appl. No.: 15/431,650

(22) Filed: Feb. 13, 2017

(65) Prior Publication Data
US 2018/0230962 A1 Aug. 16, 2018

(51) Int. Cl.
| | | |
|---|---|---|
| *F04B 53/10* | (2006.01) | |
| *F04B 43/00* | (2006.01) | |
| *F04B 9/00* | (2006.01) | |
| *F03B 13/26* | (2006.01) | |
| *F04B 43/06* | (2006.01) | |
| *F04B 19/00* | (2006.01) | |

(52) U.S. Cl.
CPC ............ *F04B 53/10* (2013.01); *F03B 13/262* (2013.01); *F04B 9/00* (2013.01); *F04B 19/00* (2013.01); *F04B 43/0081* (2013.01); *F04B 43/06* (2013.01); *F05B 2240/40* (2013.01); *F05B 2260/60* (2013.01); *Y02E 10/38* (2013.01)

(58) Field of Classification Search
CPC ...... B03D 3/04; B03D 1/1412; B03D 1/1413; B03D 1/1462; B03D 1/1475; B03D 1/24; B63B 35/44; B63B 2035/4486; B63B 21/26; B63B 21/50; B63B 2221/24; B63B 22/06; B63B 22/28; B63B 27/14
USPC .............. 60/495, 497; 417/330, 331; 290/53
See application file for complete search history.

(56) References Cited

U.S. PATENT DOCUMENTS

| | | | | |
|---|---|---|---|---|
| 6,469 | A * | 5/1849 | Lincoln ................ | B63C 7/04 114/49 |
| 3,335,667 | A * | 8/1967 | Murphy ................ | F03B 13/188 405/76 |
| 3,961,863 | A * | 6/1976 | Hooper, III .......... | F03B 13/188 417/334 |
| 4,092,827 | A * | 6/1978 | Schneider ............ | B64B 1/50 137/236.1 |
| 4,208,878 | A * | 6/1980 | Rainey ................ | F03B 13/262 290/53 |
| 4,302,161 | A * | 11/1981 | Berg ................... | F03B 13/1875 417/333 |
| 4,335,977 | A * | 6/1982 | Ihli ..................... | E02B 3/04 114/256 |
| 4,340,821 | A * | 7/1982 | Slonim ................ | F03B 13/187 290/53 |
| 4,404,801 | A * | 9/1983 | Palm ................... | F03B 17/025 60/495 |
| 4,506,623 | A * | 3/1985 | Roper ................. | B63B 7/06 114/256 |

(Continued)

FOREIGN PATENT DOCUMENTS

WO  PCT/DK83/00074  * 2/1984 ............. F03B 13/12

*Primary Examiner* — Peter J Bertheaud
*Assistant Examiner* — Geoffrey S Lee

(57) ABSTRACT

An apparatus for transporting water is described. The apparatus includes a large number of identical units that contain fresh water, for example, and which float on the sea. The units are alternately controlled to rise and fall with a first tide and to remain at low tide during the next tide. This motion, along with valves to allow fresh water to flow in one direction only, provide a water transport system that operates using tidal power.

2 Claims, 12 Drawing Sheets

(56) References Cited

U.S. PATENT DOCUMENTS

| | | | | |
|---|---|---|---|---|
| 4,735,524 A * | 4/1988 | Dunkers | ................ | B65D 88/78 405/63 |
| 4,881,482 A * | 11/1989 | Sandwith | ............... | B65D 88/78 114/256 |
| 4,883,411 A * | 11/1989 | Windle | ............... | F03B 13/1855 417/331 |
| 5,114,273 A * | 5/1992 | Anderson | ............... | E02B 15/08 405/68 |
| 5,355,819 A * | 10/1994 | Hsia | ..................... | B63B 35/285 114/242 |
| 5,445,093 A * | 8/1995 | Lilly, Jr. | ................. | B63B 27/24 114/256 |
| 5,657,714 A * | 8/1997 | Hsia | ..................... | B63B 35/285 114/242 |
| 6,161,561 A * | 12/2000 | Pratt | ....................... | E03B 11/00 137/1 |
| 6,615,759 B2 * | 9/2003 | Yaffe | ..................... | B63B 27/24 114/256 |
| 7,257,946 B2 * | 8/2007 | Welch, Jr. | ........... | F03B 13/1875 290/53 |
| 7,416,666 B2 * | 8/2008 | Gordon | ............... | B01D 61/025 210/257.2 |
| 7,713,032 B2 * | 5/2010 | Davis, Sr. | ........... | F03B 13/1865 417/313 |
| 7,823,380 B2 * | 11/2010 | Ghouse | ................ | F03B 13/147 60/496 |
| 7,841,289 B1 * | 11/2010 | Schanz | .................. | B63B 25/08 114/256 |
| 7,956,479 B1 * | 6/2011 | Bergman | ................ | F03B 13/187 290/53 |
| 8,105,052 B1 * | 1/2012 | Hill, Jr. | .................. | F04B 17/00 417/331 |
| 8,308,449 B2 * | 11/2012 | Smith | ................... | F03B 13/187 137/243 |
| 8,322,294 B2 * | 12/2012 | Bowhay | ................. | B63B 35/44 114/256 |
| 8,405,241 B2 * | 3/2013 | Chen | ........................ | F03B 7/00 290/53 |
| 8,429,910 B2 * | 4/2013 | Ghouse | ............... | F03B 13/1815 417/100 |
| 8,484,965 B2 * | 7/2013 | Von Bulow | ........... | F03B 13/185 290/53 |
| 8,668,472 B2 * | 3/2014 | Tillotson | ............... | F03B 13/189 417/332 |
| 8,836,153 B2 * | 9/2014 | Ehrnberg | .............. | F03B 13/188 290/42 |
| 9,499,249 B2 * | 11/2016 | Bowhay | .................... | B63J 1/00 |
| 9,581,130 B2 * | 2/2017 | Zakheos | ............... | F03B 13/188 |
| 9,617,172 B1 * | 4/2017 | Baski | ................ | B01D 29/0068 |
| 9,771,921 B2 * | 9/2017 | Ghouse | ............... | F03B 13/1815 |
| 9,850,144 B1 * | 12/2017 | Baski | ................ | B01D 29/0068 |
| 2003/0189000 A1 * | 10/2003 | Stark | ...................... | B01D 61/10 210/153 |
| 2004/0255513 A1 * | 12/2004 | Becker | ..................... | A01G 9/00 47/65.9 |
| 2008/0018114 A1 * | 1/2008 | Weldon | ................. | F03B 13/181 290/53 |
| 2008/0229745 A1 * | 9/2008 | Ghouse | ................ | F03B 13/147 60/641.7 |
| 2009/0226331 A1 * | 9/2009 | Sieber | .................. | F03B 13/187 417/53 |
| 2009/0261593 A1 * | 10/2009 | Culjak | .................. | F03B 13/262 290/53 |
| 2010/0051546 A1 * | 3/2010 | Vuong | ................. | B01D 61/027 210/637 |
| 2012/0193920 A1 * | 8/2012 | Jeon | ...................... | F03B 13/266 290/53 |
| 2013/0186345 A1 * | 7/2013 | Leslie | .................... | A01K 61/54 119/240 |
| 2015/0345462 A1 * | 12/2015 | Hu | .......................... | F03B 13/20 290/53 |
| 2017/0184071 A1 * | 6/2017 | Androsiuk | .......... | F03B 13/1875 |

* cited by examiner

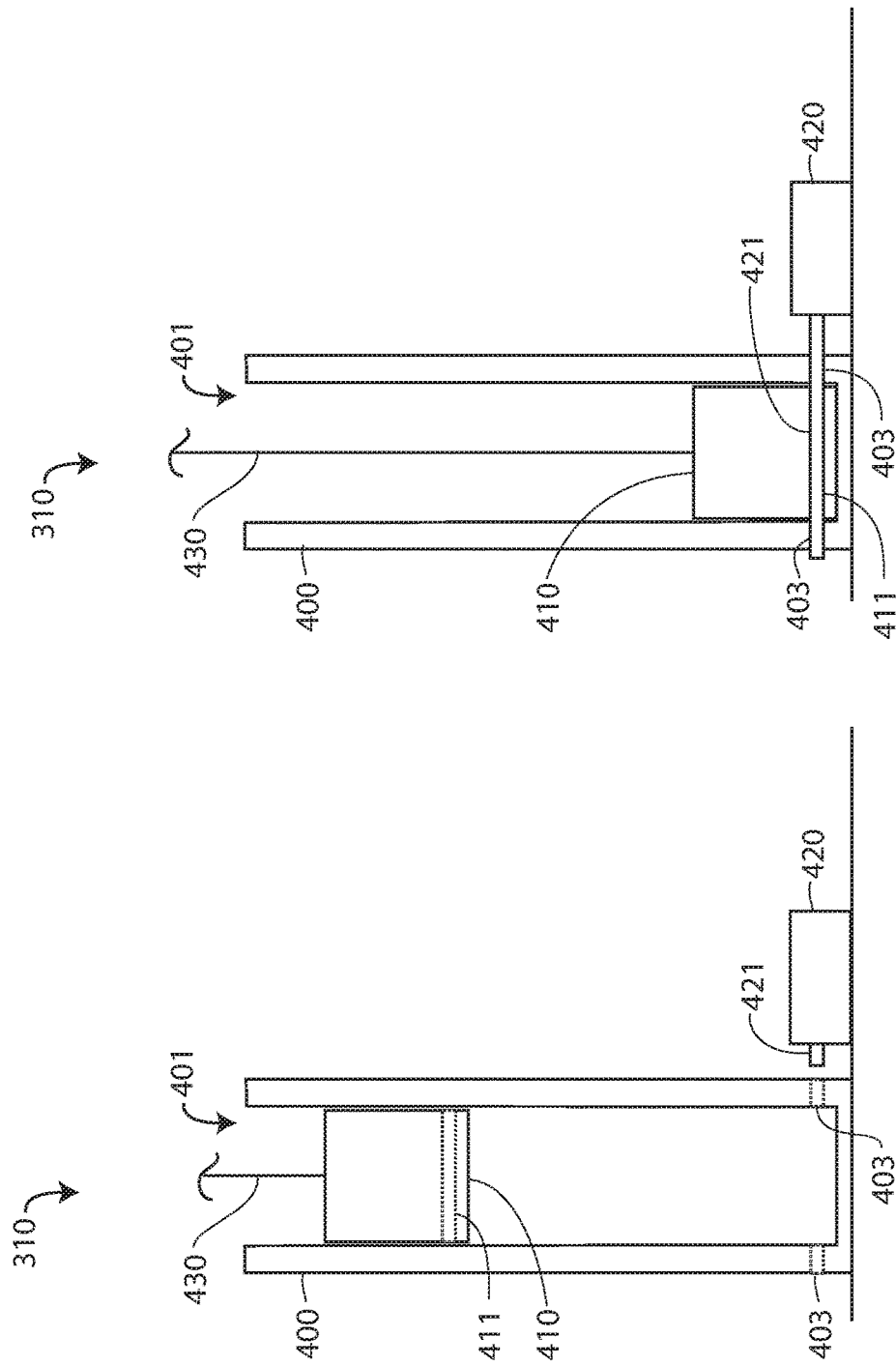

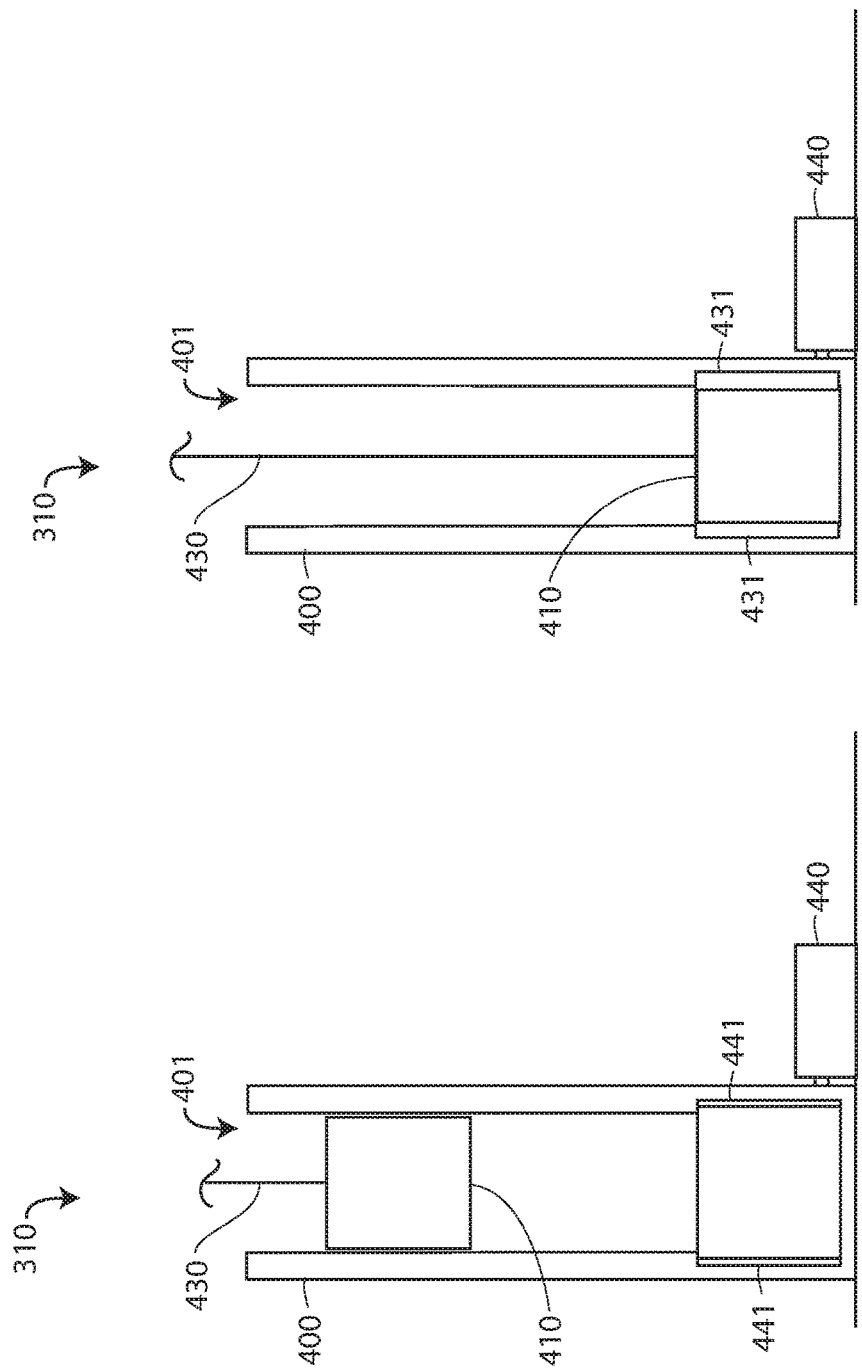

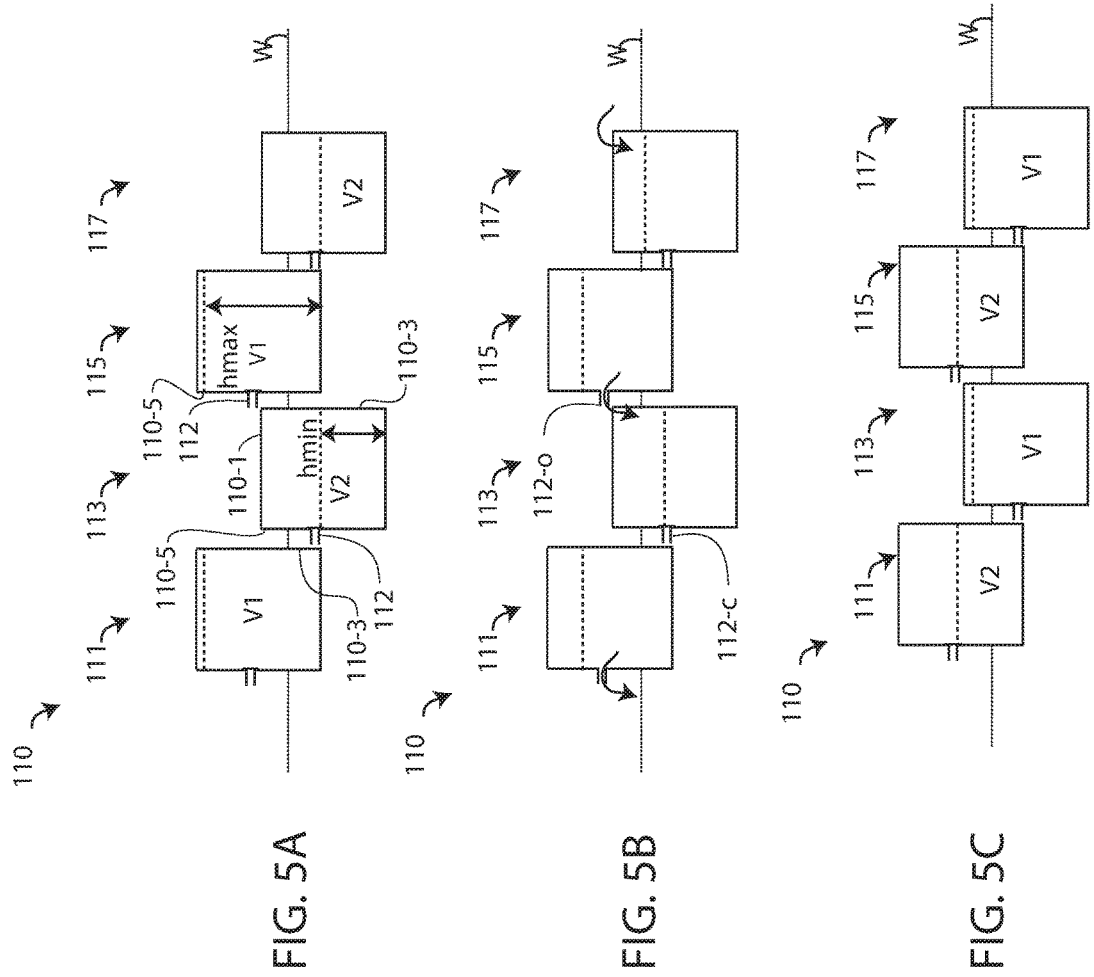

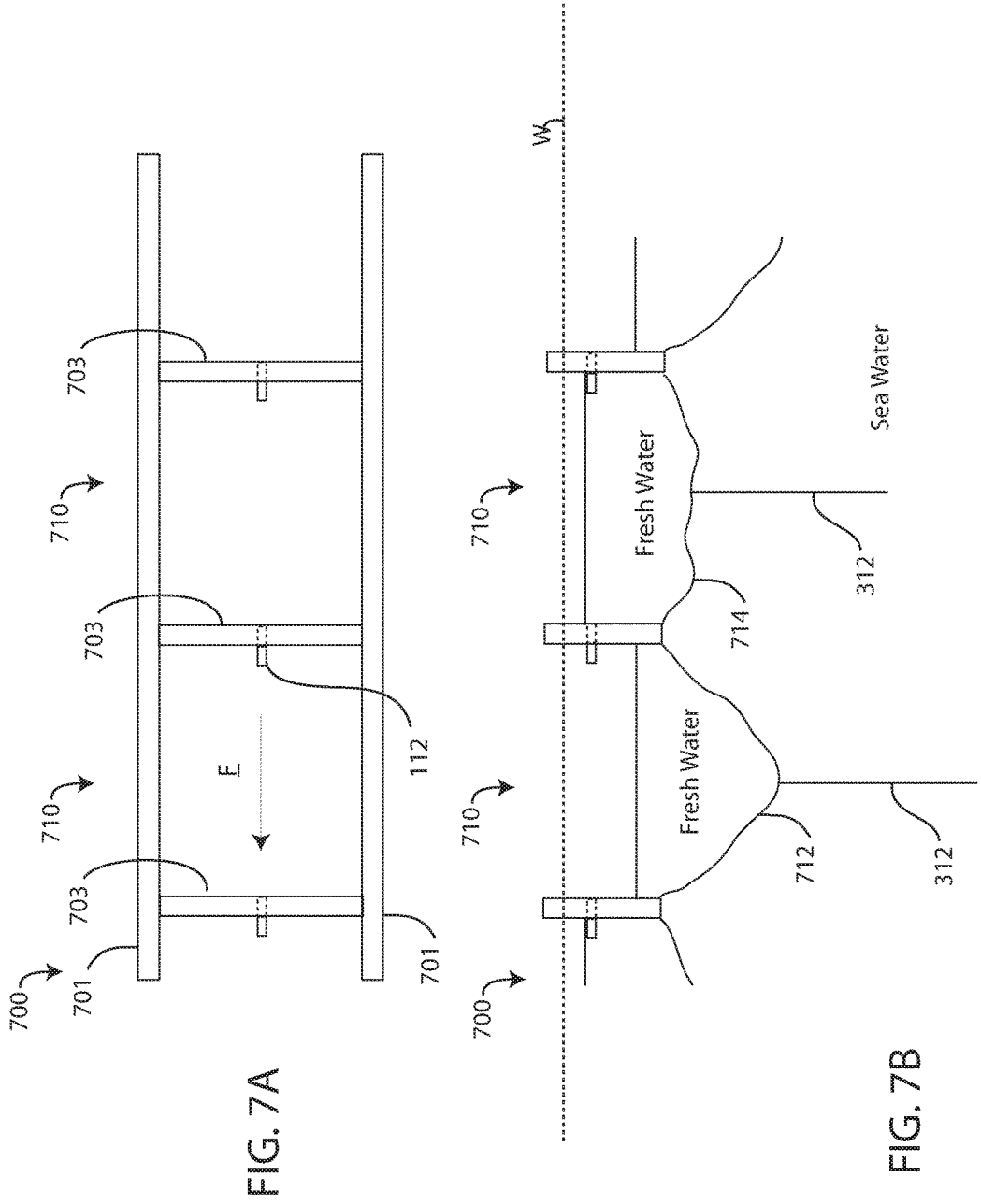

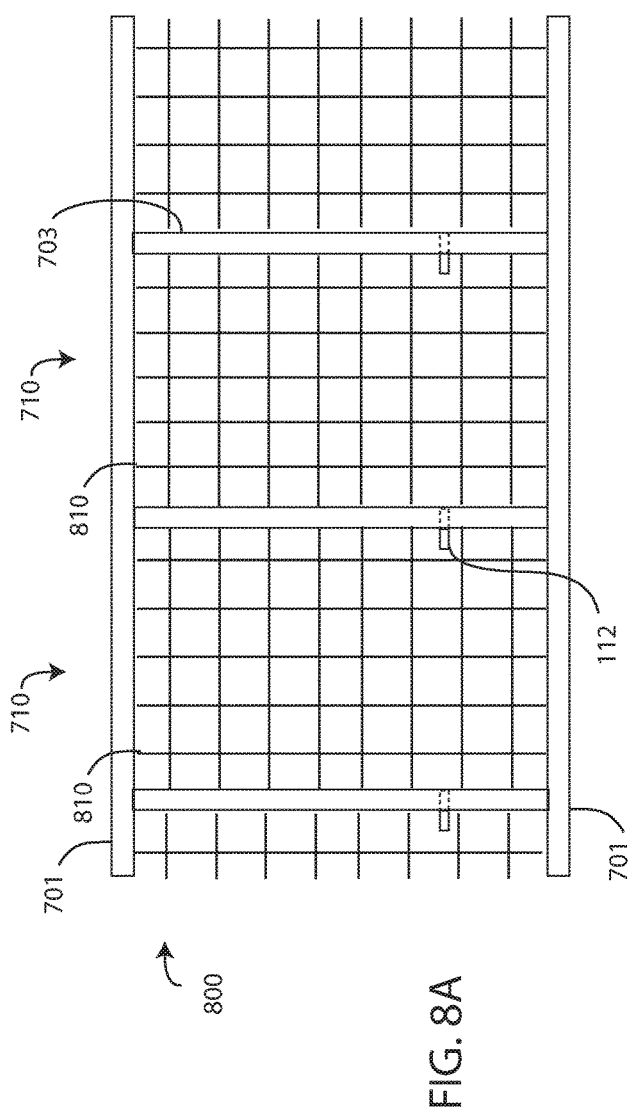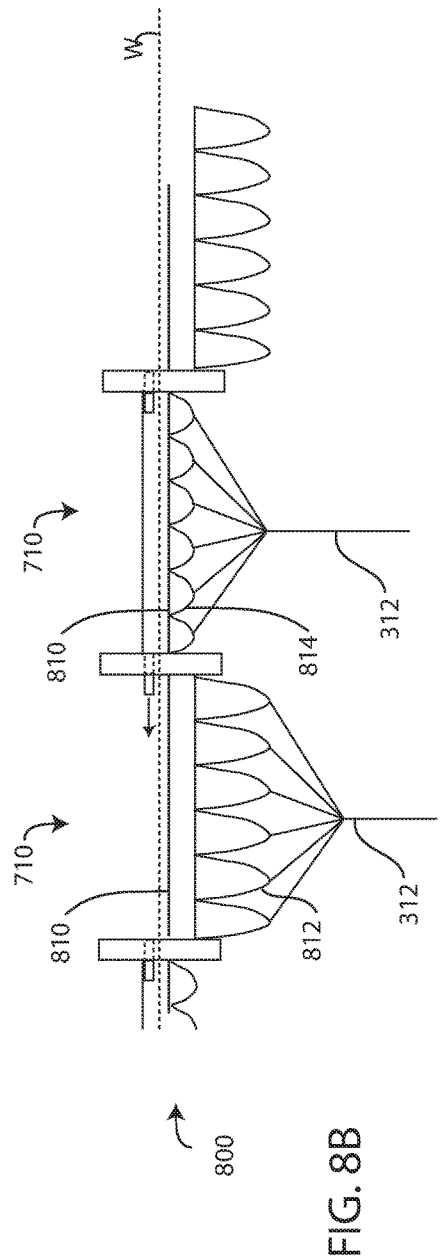
FIG. 8A
FIG. 8B

FRESH WATER TRANSPORT METHOD UTILIZING ANCHORED BUOYANT UNITS POWERED BY THE CHANGING HEIGHT OF A LOCAL TIDE

BACKGROUND OF THE INVENTION

Field of the Invention

The present invention generally relates to apparatus and methods for transporting fluids, which may include water, and more particularly to a method and system for efficiently transporting fluids over long distances using tidal power.

Discussion of the Background

The transport of fluids, such as water or oil, over long distances may be accomplished by shipping or by transport through a dedicated fixed system of pipes or conduits. While the use of a conduits or pipe is effective, this technique has several problems. First, the fluid experiences drag on walls of the conduit, requiring a large amount of energy to overcome frictional losses. In addition, if the system relies on gravity to provide flow, then it is also necessary to provide a consistent slope to the system over long distances.

There is a need in the art for a method and apparatus that permits the more efficient transport of material over large distances. Such a method and apparatus should be simple to construct and operate, consume less power than conventional conduits or pipes, and be less affected by the slope of the ground on which the conduit or pipes rest.

BRIEF SUMMARY OF THE INVENTION

The present invention overcomes the disadvantages of prior art by providing an apparatus wherein water is transported across the sea using tidal power.

One embodiment provides an apparatus for transporting fresh water in a flow direction along the apparatus utilizing tidal power obtained from a sea having a seabed. The apparatus includes a plurality units positioned near the surface of the sea, where the unit of the plurality of units has a volume to contain water, where each unit of the plurality of units is adjacent to downstream unit in the flow direction and an upstream unit a direction opposite to the flow direction. Each unit of the plurality of units includes a mechanism that alternates between a first configuration to restrain each unit of the plurality of units to remain at a level at or near the level at low-tide and a second configuration to allow each unit of the plurality of units to float, and a valve to allow contained water in each unit to flow to a downstream unit that is at a lower level, where the mechanism of adjacent units of the plurality of units alternate between the first configuration and the second configuration.

Another embodiment provides an apparatus for transferring water in a flow direction along the apparatus utilizing tidal power obtained from a sea having a seabed. The apparatus includes: a plurality of buoyant units each having a volume and a variable level in the sea, and arranged in the flow direction; a valve to allow contained water in each unit of the plurality of units to flow to a downstream unit that is a lower level; and a mechanism that controls the level of each unit of the plurality of units in the sea, in where the mechanism of adjacent units of the plurality of units alternate between the first configuration and the second configuration.

Yet another embodiment provides and apparatus for transferring water in a flow direction along the apparatus utilizing tidal power obtained from a sea having a seabed. The apparatus includes: a rigid wall; a plurality of units each including a flexible bottom and rigid side walls to contain water and arranged in the flow direction; a valve to allow contained water in each unit of the plurality of units to flow to a downstream unit that is a lower level; and a mechanism that controls the level of each flexible bottom in the sea, where the mechanism of adjacent units of the plurality of units alternate between the first configuration and the second configuration.

One embodiment provides a method for transporting fresh water in a flow direction in an apparatus in the sea utilizing tidal power. The method includes: providing a plurality of units including first plurality of units and a second plurality of units alternating with the first plurality of units. For alternating tides including a first tide and the next second tide, the method includes controlling the height of each unit of the first plurality of units to rise with a first tide and to be held at a low tide level during the second tide, controlling the height of each unit of the second plurality of units to be held at a low tide level during the first tide and to rise with a the second tide, and allowing water from the plurality of units controlled to rise with a tide to flow into an adjacent unit of the plurality of units.

BRIEF DESCRIPTION OF THE SEVERAL VIEWS OF THE DRAWING

FIG. 4A illustrates a first embodiment of a mechanism in a first configuration that allows an attached unit to rise and fall with the tide;

FIG. 4B illustrates the mechanism of FIG. 4A in a second configuration that prevents the attached unit from rising;

FIG. 4C illustrates a second embodiment of a mechanism in a first configuration that allows an attached unit to rise and fall with the tide;

FIG. 4D illustrates the mechanism of FIG. 4B in a second configuration that prevents the attached unit from rising;

FIG. 5A illustrates how the water transport apparatus causes water to flow in one general direction, corresponding with FIG. 3A;

FIG. 5B illustrates how the water transport apparatus causes water to flow in one general direction, corresponding with FIG. 3B;

FIG. 5C illustrates how the water transport apparatus causes water to flow in one general direction, corresponding with FIG. 3C;

FIG. 7A is a top view of an alternative embodiment water transport apparatus;

FIG. 7B is a side view of the embodiment of FIG. 7A;

FIG. 8A is a top view of another alternative embodiment water transport apparatus; and FIG. 8B is a side view of the embodiment of FIG. 8A.

Reference symbols are used in the Figures to indicate certain components, aspects or features shown therein, with reference symbols common to more than one Figure indicating like components, aspects or features shown therein.

DETAILED DESCRIPTION OF THE INVENTION

Embodiments described herein may utilize tidal power to transport fresh water along the coast. Energy is extracted from the alternating high and low tide interaction with segments of an apparatus to move the water between adjacent segments.

Figure 1:
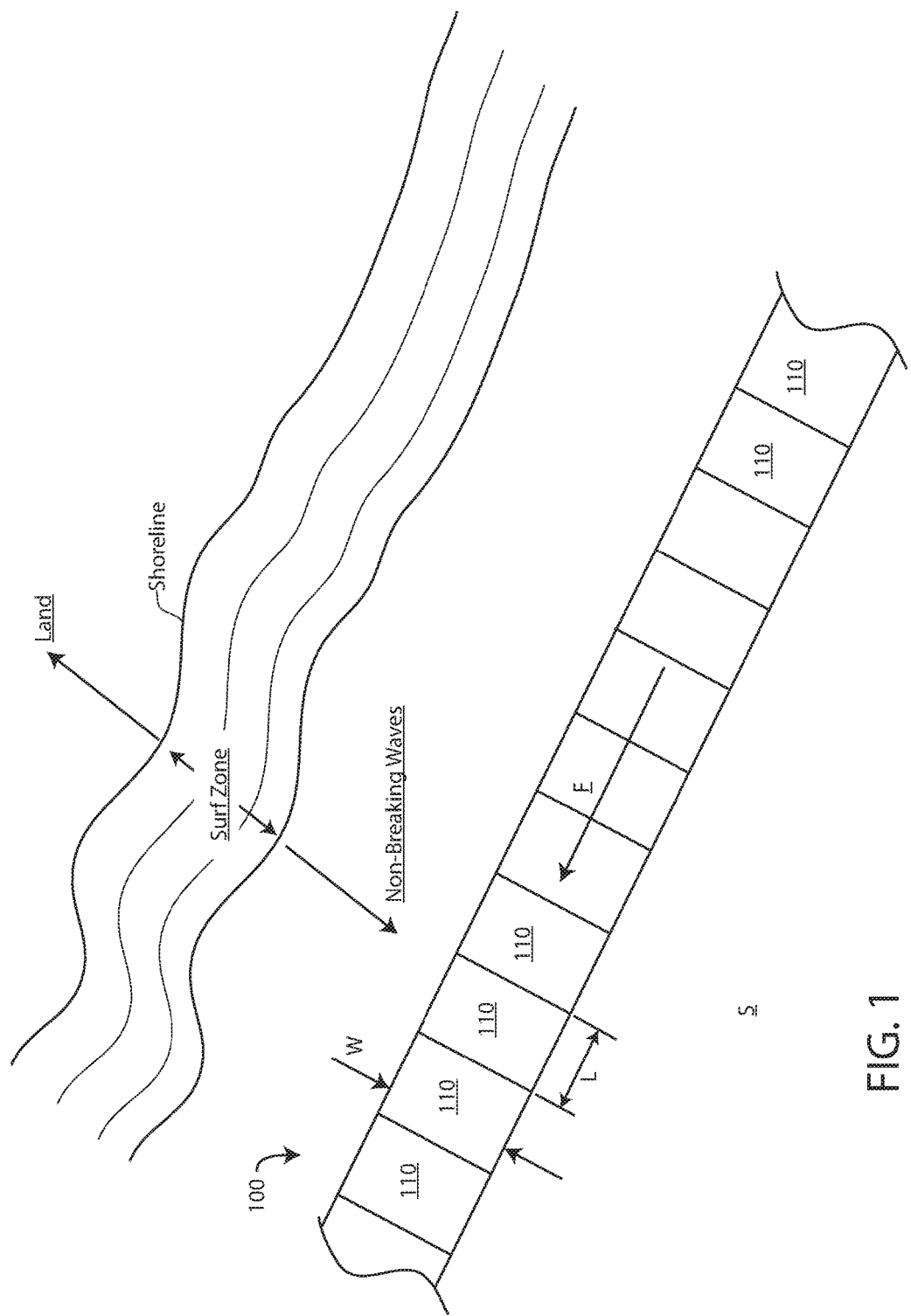
FIG. 1 is a top view of one embodiment of a water transport apparatus.

FIG. 1 is a top view of one embodiment of a water transport apparatus 100. As described subsequently, water transport apparatus 100 may be situated in open water, such as in sea S, and preferably at a location far enough from the shore such that the major water movement is the variation of tides throughout the day. Apparatus 100 includes a plurality of generally linearly arranged units 110. Fluid, F, which may be fresh water, is contained in units 110 and is urged by the motion of the units to flow in a direction along apparatus 100, which utilizes tidal power. As described subsequently, units 110 may rise and fall with the tides or may be restrained a low tide position, and include valves that allow water to flow in one direction (indicate by the arrow F), thus transporting water from tidal power.

Figure 2:
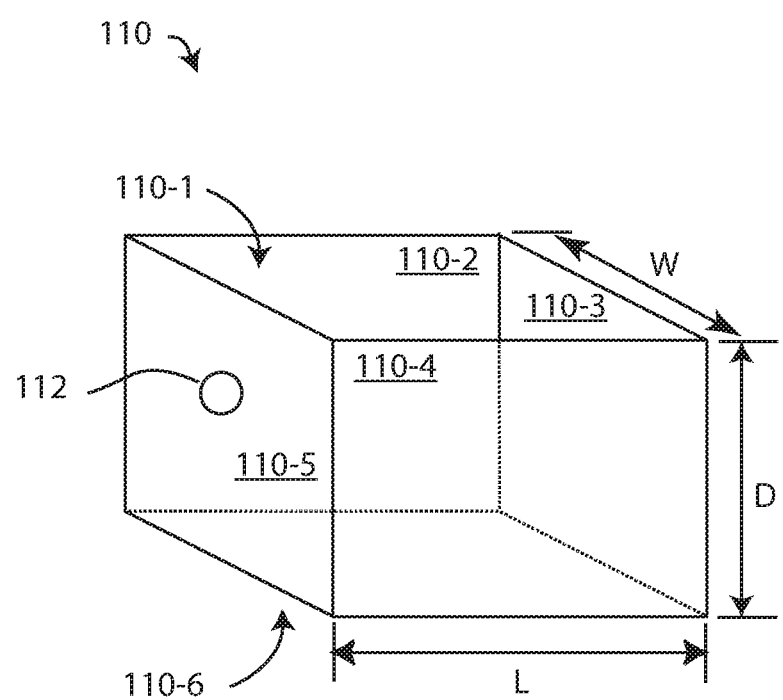
FIG. 2 is a schematic perspective view showing embodiments of one unit.

In general, the plurality of units 110 has identical components and structure. FIG. 2 is a schematic perspective view showing embodiments of one unit 110 as having six rectangular sides 110-1, 110-2, 110-3, 110-4, 110-5, and 110-6. Sides 110-2 and 110-4 are separated by a width W, sides 110-3 and 110-5 are separated by a length L, a rectangular side 110-6 forms the bottom, and open side 110-1 forms the top of the unit. Side 110-5 also has a valved passageway 112 that permits the flow of water out from the interior of unit 110 depending of if the valve is open or closed. In certain embodiments, water flows into unit 110 from a valved passageway from a unit adjacent to side 110-3. As explained subsequently, the up and down motion of the plurality of units 110, the valved passageway 112, and a mechanism restricting the upwards movement of alternate units results in a flow of water from side 110-3 to side 110-5 of the units.

In one embodiment, each valve passageway 112 includes a flapper valve that allows water to flow only in one direction—out of the unit to which it attached. In one embodiment, passageway 112 opens based on the pressure of water upstream of the valve. In another embodiment, each valved passageway 112 is remotely controlled (by a computer system that is not shown) according to the tides to open and close the passageway according a sensed amount of water in the unit and/or the relative height of the unit and of surrounding units. In yet another embodiment, the opening and closing of each valve passageway 112 is controlled by a timer.

FIGS. 3A-3F are six temporally sequential figures of water transport apparatus 100 during the course of the day. Water transport apparatus 100 includes the plurality of units 110 each attached by a corresponding cable to a corresponding mechanism 310 on the seabed. Thus, for example, four adjacent units 110 and mechanisms 310 are shown indicated as unit 111 having a cable 312 and an associated mechanism 311, unit 113 having a cable 314 and an associated mechanism 313, unit 115 having a cable 316 and an associated mechanism 315, and unit 117 having a cable 318 and an associated mechanism 317. In practice, there are a large number of units in each direction (to the right and left of the illustrated units 110), each having a cable and mechanism. Mechanisms 310 are controlled (by a computer system that is not shown) according to the tide to raise and lower units 110.

Figure 3A:
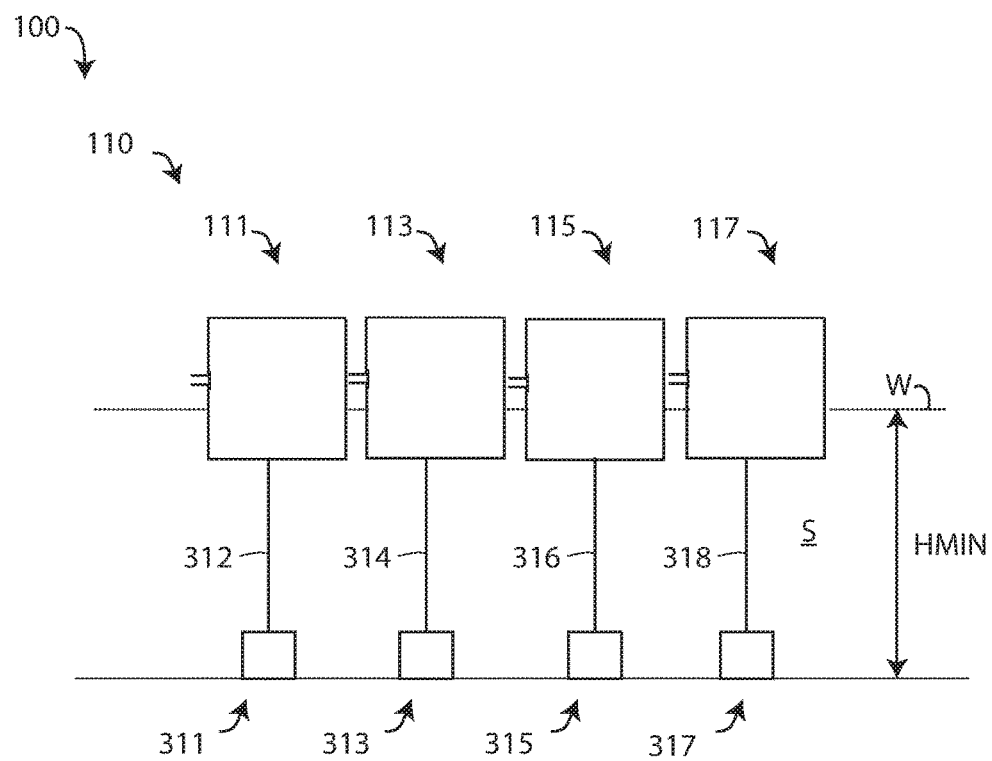
FIG. 3A is a first of six temporally sequential figures of the water transport apparatus during the course of the day.
Figure 3B:
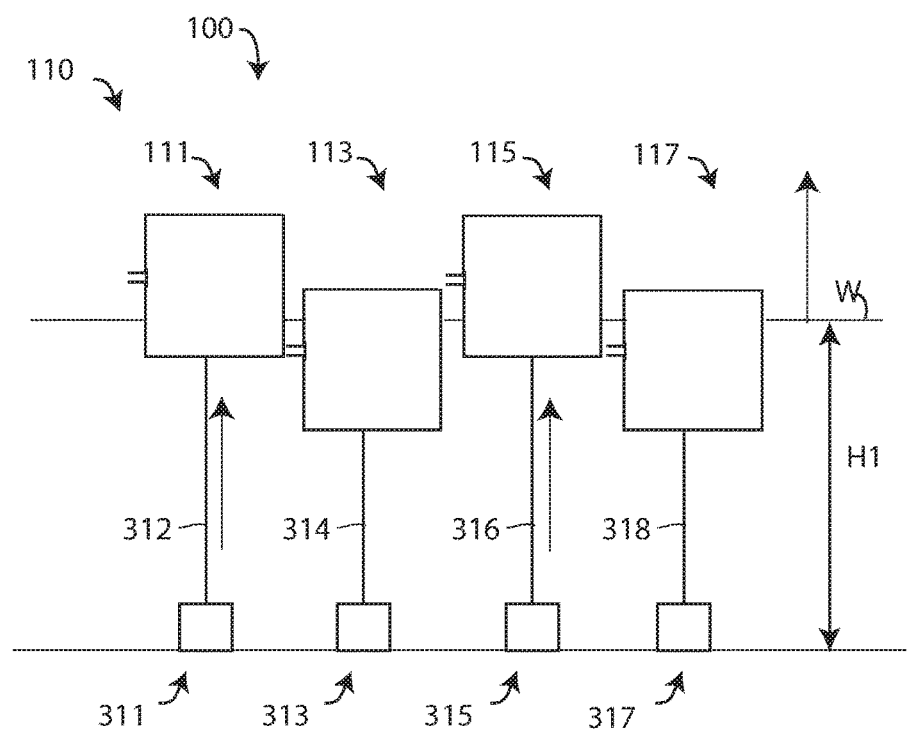
FIG. 3B is a second of six temporally sequential figures of the water transport apparatus during the course of the day.
Figure 3C:
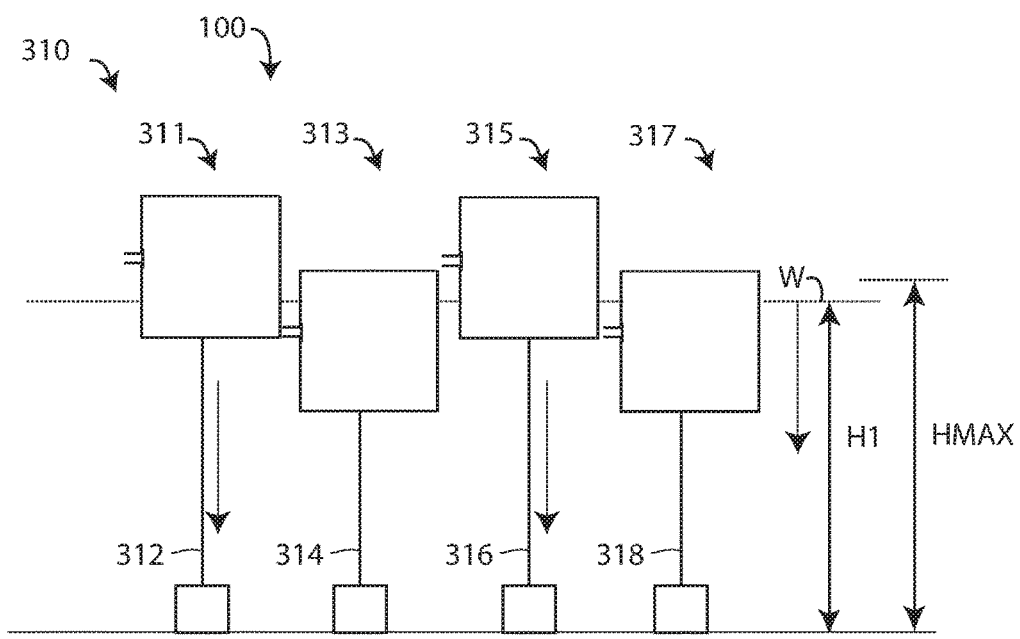
FIG. 3C is a third of six temporally sequential figures of the water transport apparatus during the course of the day.
Figure 3D:
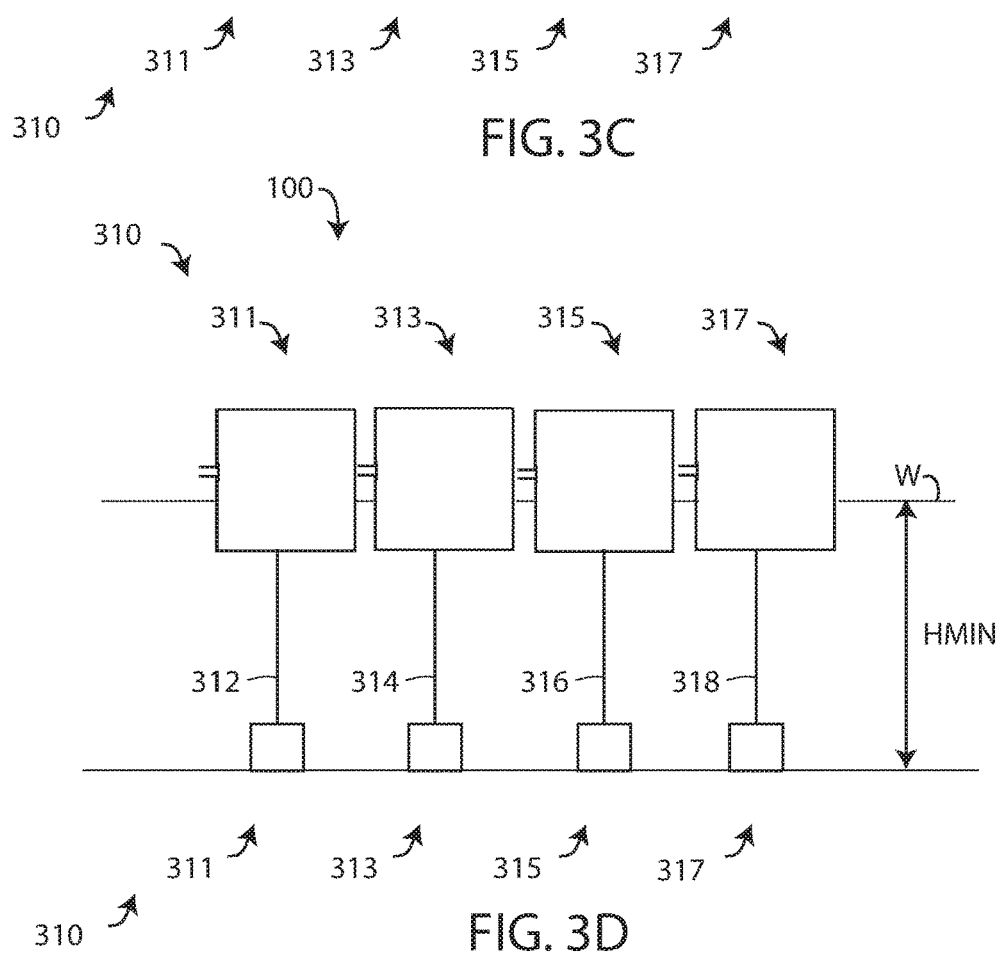
FIG. 3D is a forth of six temporally sequential figures of the water transport apparatus during the course of the day.
Figure 3E:
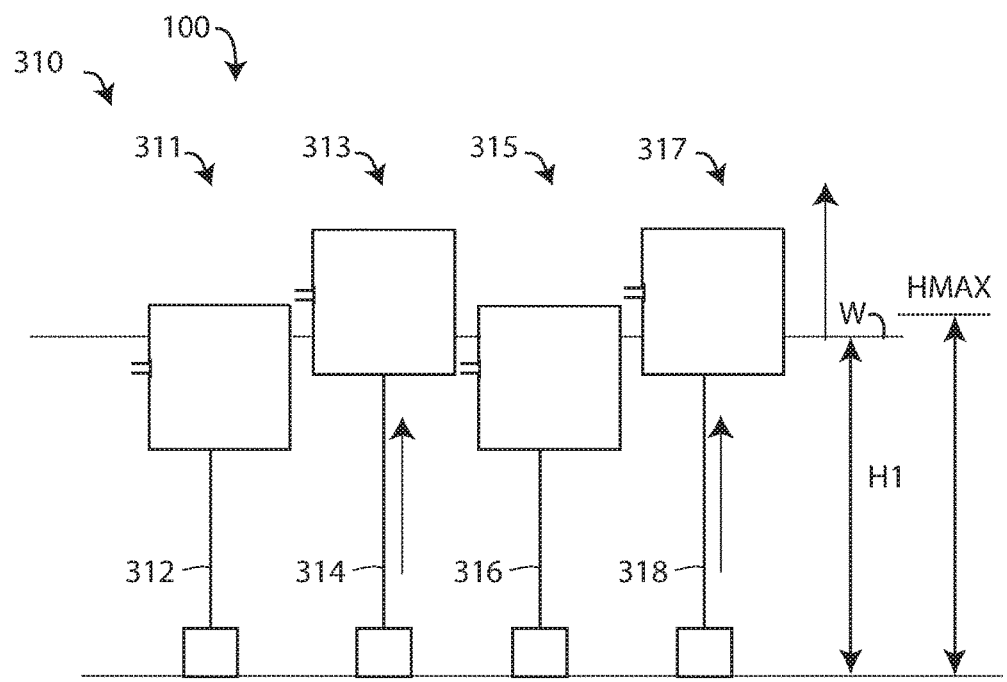
FIG. 3E is a fifth of six temporally sequential figures of the water transport apparatus during the course of the day.
Figure 3F:
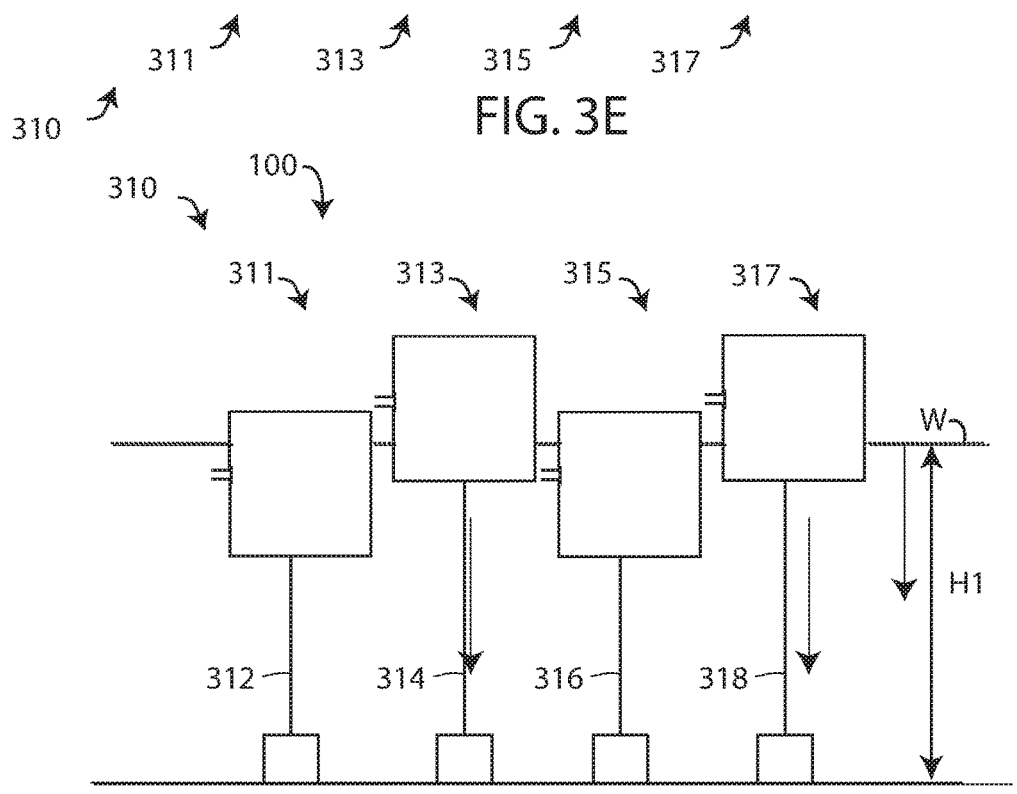
FIG. 3F is a sixth of six temporally sequential figures of the water transport apparatus during the course of the day.

Thus, as shown in FIGS. 3A-F, units 110 may move up and down in sea S over time, with the heights of units 110 alternating from one unit to the next. Thus, FIGS. 3B and 3C show units 111 and 115 as being higher that units 113 and 117, and FIGS. 3E and 3F show units 111 and 115 as being lower that units 113 and 117. This pattern is repeated for all units 110 of water transport apparatus 100. As the tide continues to rise and fall, the sequence shown in FIGS. 3A-3F is repeated.

Mechanisms 310 are operated to allow the corresponding unit 110 to first rise and fall with a tide, and then remain at the low tide position for the next tide. Mechanisms 310 alternate in their operation for each unit and each tide so that alternate units rise and fall with the tide. As described subsequently, the up and down motion of each fresh water containing unit, along with valves that selectively allow water to flow between units in a preferred direction result in the flow of fresh water in one direction through water transport apparatus 100.

First, the motion of units 110 will be described, followed by a discussion of how water flows from one unit to another.

FIG. 3A illustrates water transport apparatus 100 at low tide, having a depth HMIN.

As the tide rises, every other unit 110 is allowed to rise on every other tide. FIG. 3B illustrates how mechanisms 310 respond to the rising tide. Every other mechanism 310 allows the corresponding unit 110 to rise with the tide according to its buoyancy, while keeping the other unit at the low-tide level as shown in FIG. 3A. Thus, as the sea rises (shown with a depth H1), mechanism 311 and 315 allow cables 312 and 316, respectively, to move, while mechanisms 313 and 315 prevent cables 314 and 318 from lengthening.

The tide eventually reaches a maximum depth HMAX, and then recedes. FIG. 3C illustrates water transport apparatus 100 as the tide recedes back down to depth H1. Units 311 and 315 fall with the tide, while mechanisms 311 and 315 take in slack from cables 312 and 316, respectively.

FIG. 3D illustrates the water transport apparatus 100 at low tide, with depth HMIN. At low tide, mechanisms 310 reverse their action—mechanisms that allowed unit 110 to float now restrain the motion and mechanisms that restrained the units now allow them to float.

As the tide rises, FIG. 3E illustrates that mechanisms 310 thus operate opposite to what is shown in FIG. 3B. Mechanism 313 and 317 allow cables 314 and 318 to move, respectively, while mechanisms 311 and 315 prevent cables 312 and 316 from lengthening.

The tide reaches a maximum depth HMAX, and then recedes. FIG. 3F illustrates water transport apparatus 100 as the tide recedes, to depth H1. Units 313 and 317 fall with the tide, while mechanisms 313 and 317 take in slack from cables 314 and 318, respectively.

FIG. 4A illustrates a first embodiment mechanism 310 in a first configuration that allows an attached unit (not shown) to rise and fall with the tide. FIG. 4B illustrates the same mechanism in a second configuration that prevents the attached unit from rising. Mechanism 310 includes a housing 400, a block 410, and a latching mechanism 420. Housing 400 and latching mechanism 420 both rest on the seabed. Housing 400 has an opening 401 at a top end and a pair of holes 403 near the bottom. Block 410 is attached to a cable 430. Cable 430 may be, for example, one of cables 312, 314, 316, or 318. Latching mechanism 420 includes a bolt 421 which may be actuated to be retracted, as in FIG. 4A or extended, as in FIG. 4B.

In the configuration of FIG. 4A, any unit 110 attached to cable 430 is free to float up or down with the tide, with block 410 moving up or down in opening 401 in concert with the unit. In the configuration of FIG. 4B, corresponding to a low tide, block 410 sits at the bottom of opening 401. In this configuration, through hole 411 is aligned with the pair of holes 403, which is also in line with bolt 421. As shown in FIG. 4B, latching mechanism 420 has moved bolt 421 to pass through hole 411 and the pair of holes 403, thus locking block 410 in place and, through cable 430, prevent an attached unit from rising with the tide. Latching mechanism 420 is operable to move bolt 421 between the configuration in FIG. 4A, allowing units to rise with the tide (as, for example, with unit 111 in FIGS. 3B and 3C), and the configuration in FIG. 4B, restricting the rising of units with the tide (as, for example, with unit 113 in FIGS. 3B and 3C). The movement of bolt 421 may be controlled, for example and without limitation, by a timer in mechanism 420 or in some remote computer in which it is in communication, or by the use of sensors.

FIGS. 4C and 4D illustrates a second embodiment mechanism 310 in a first and second configuration, respectively, that allows an attached unit (not shown) to rise and fall with the tide. FIGS. 4C and 4D correspond to FIGS. 4A and 4B, and differ from the first embodiment of FIGS. 4A and 4B, as follows.

Mechanism 310 of FIGS. 4C and 4D includes a pump 430 and a bladder 431. Bladder 431 is operable to deflate (as in FIG. 4C) and inflate (as in FIG. 4D), according to the operation of pump 430. In the deflated configuration of FIG. 4C, block 410 is free to move within housing 400 and, specifically, any unit 110 attached to cable 430 is free to float up or down with the tide, with block 410 moving up or down in opening 401 in concert with the unit. In the inflated configuration of FIG. 4D, corresponding to low tide, bladder 431 pushes against block 410, restraining its motion. The operation of pump 430 may be controlled, for example and without limitation, by a timer in the pump or in some remote computer in which it is in communication, or by the use of sensors.

FIGS. 5A-5F are 6 sequential views, in time, generally corresponding to several of figures in the sequence 3A-3F, illustrating how water transport apparatus 100 causes water to flow in one general direction. FIGS. 5A-5F shows four adjacent units 110. In practice this is a view of representative units, and there are a large number of units in each direction (to the right and left of the illustrated units 110).

More specifically, FIGS. 5A-5C shows units 110 at a first high tide, corresponding to a time between that shown in FIGS. 3B and 3C. With reference to FIG. 5A, each unit 110 is arranged with side 110-3 near side 110-5 of one adjacent unit 110 and side 110-5 near side 110-3 of the adjacent unit. Thus, for example, unit 113 has a side 110-5 that is near side 110-3 of unit 111 and a side 110-3 that is near side 110-5 of unit 115.

In FIGS. 5A-5C, units 111 and 115 are higher than unit 113 and 117 by a distance Δ. The distance Δ is such that alternate valved passageways 112 are higher than the top 101-1 of the adjacent unit. Thus, valved passageway 112 of units 113 and 117 are low compared to units 111 and 115, and the openings from units 111 and 115 are above the top opening 111-1 of units 113 and 117, respectively.

In FIG. 5A, each valve passageway 112 is closed, the higher units 110 contain more water. Thus, for example, units 111 and 115 have liquid to a height of hmax for a liquid volume V1 and units 113 and 117 have liquid to a height hmin, for a liquid volume V2, where V2<V1.

At a subsequent time, in FIG. 5B, the valved passageway 112 for each unit in a relatively high position (such as units 111 and 115) are opened. This allows fluid to flow, for example, from unit 115 to 113. When valved passageways 112 of the higher units 111/115 are opened, for example, water from in unit 115 flows into unit 113. In addition, water from unit 111 flows to a unit (not shown) to the left of unit 111, and water flows into unit 117 from a unit (not shown) to the right of unit 117.

In FIG. 5C, water from each unit 110 has been transferred to adjacent units, and all valved passageways 112 are closed, and a volume of water V1-V2 has been transferred to the left. Thus, for example, the volume V1 that was in unit 115 in FIG. 5A is a volume V2 in FIG. 5C, with the excess water transferred to unit 113, which had a volume of water V2 in FIG. 5A and a volume of water V1 in FIG. 5C.

Figure 5D:
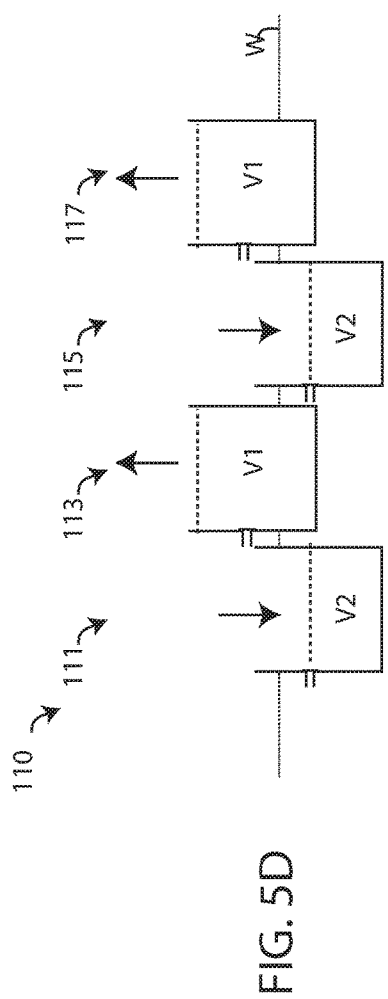
FIG. 5D illustrates how the water transport apparatus causes water to flow in one general direction, corresponding with FIG. 3A.
Figure 5E:
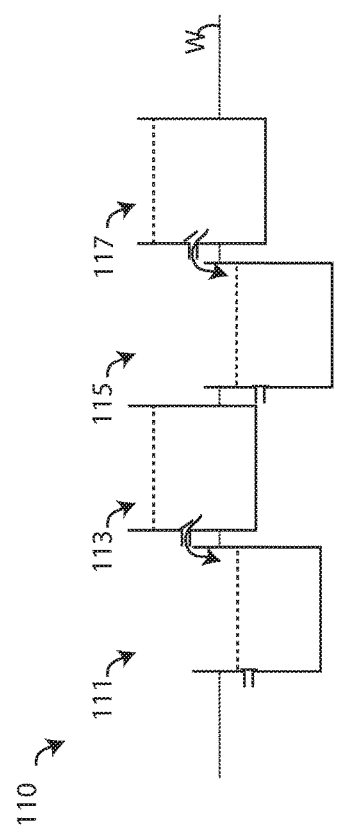
FIG. 5E illustrates how the water transport apparatus causes water to flow in one general direction, corresponding with FIG. 3E.
Figure 5F:
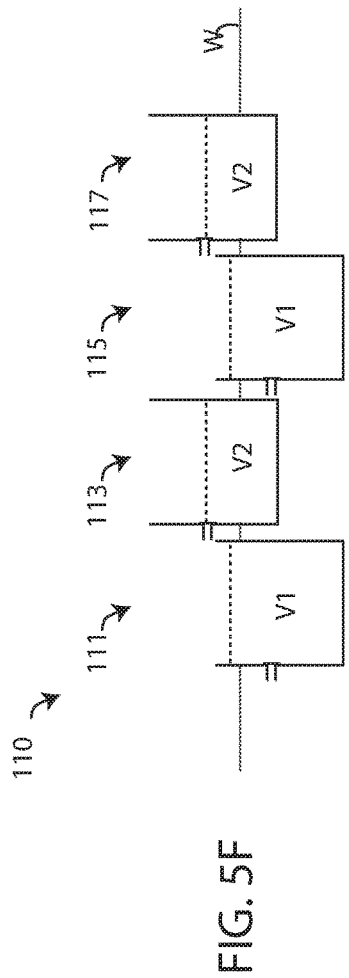
FIG. 5F illustrates how the water transport apparatus causes water to flow in one general direction, corresponding with FIG. 3F.

FIGS. 5E-5F show units 110 at the next high tide, corresponding to a time between that shown in FIGS. 3E and 3F, where units 111 and 115 are lower than unit 113 and 117 by a distance Δ. Valved passageway 112 of units 113 and 117 are high compare to units 111 and 115, and the openings from units 113 and 115 are above the top opening 111-1 of units 111 and 113, respectively.

In FIG. 5D, valved passageways 112 are closed, units 111 and 115 have a volume V2 of water, and units 113 and 117 are higher than units 111 and 115 have volumes V1 of water, where V2<V1.

At a subsequent time, in FIG. 5E, the valved passageway 112 for each unit in a relatively high position (such as units 113 and 117) are opened. This allows fluid to flow, for example, from unit 113 to 111. When valved passageways 112 of the higher units 113/117 are opened, for example, water from in unit 113xzx flows into unit 111. In addition, water from unit 117 flows to a unit 115.

In FIG. 5F, water from each unit 110 has been transferred to adjacent units, and all valved passageways 112 are closed, and a volume of water V1-V2 has been transferred to the left. Thus, for example, the volume V1 that was in unit 113 in FIG. 5D is a volume V2 in FIG. 5F, with the excess water transferred to unit 111, which had a volume of water V2 in FIG. 5D and a volume of water V1 in FIG. 5F.

It is thus seen that the up and down motion of units 110 caused by wave action, as shown in FIGS. 3A-3F, coupled with the opening and closing of valves 112, as shown in FIGS. 5A-5F, result in an amount of water V1-V2 being transferred twice for each up and down wave motion.

In one embodiment, water transport apparatus 100 has a width (perpendicular to the movement of water) of from 50 feet to 500 feet, and may, for example have a width of 200 feet. In another embodiment, several water transport apparatus are arranged in parallel. Thus, for example, a system may include 6 water transport apparatuses each formed from many units each with a width W of 200 feet wide, a length L of 200 feet long, and depth D of 10 feet. Such a system has an effective width of 1200 feet. It is calculated that system 100 could pump 1.4 million cubic feet of water per day using tidal power to affect the flow.

Figure 6:
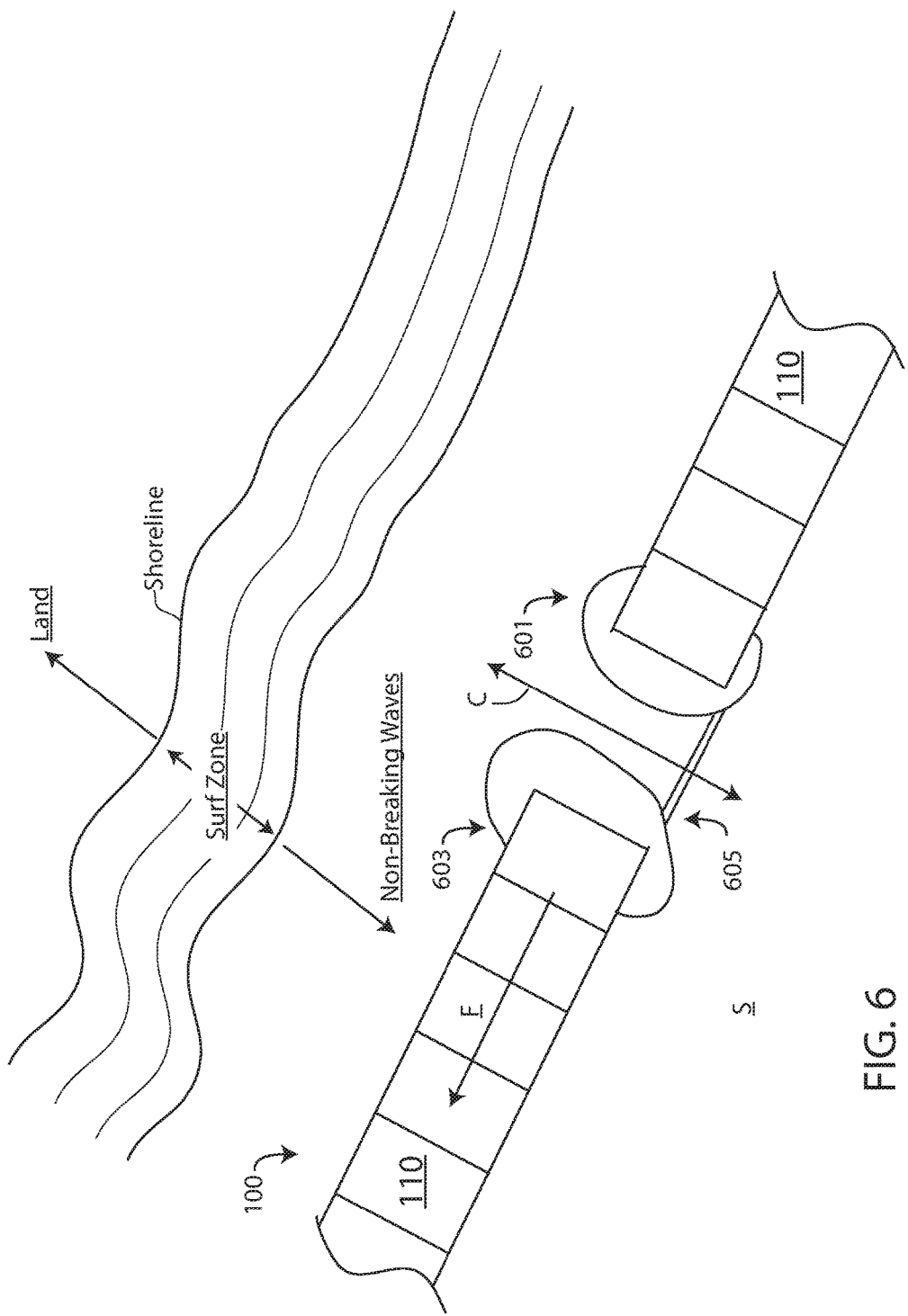
FIG. 6 illustrates an alternative embodiment water transport apparatus with a pair of floating freshwater reservoirs and an underwater tube.

In another embodiment, there may be a break between adjacent units with underwater tubes for transferring water. FIG. 6 illustrates an alternative embodiment water transport apparatus 100 with a pair of floating freshwater reservoirs 601 and 603 and an underwater tube 605 having a pump (not shown). Reservoir 601 accumulates water from a portion of water transport apparatus 100, and the water is transferred by tube 605 to reservoir 603, which provides water to another portion of the water transport apparatus. Underwater tube 605 allows for shipping channel C across apparatus 100.

FIGS. 7A and 7B illustrate a top view and a side view, respectively, of an alternative embodiment water transport apparatus 700 formed from a plurality of units 710. Each unit 710 is attached by cable to a mechanism 310 (not shown in FIGS. 7A and 7B). Water transport apparatus 700 and units 710 are generally similar to water transport apparatus 100 and units 110, except as explicitly discussed subsequently.

Water transport apparatus 700 includes a pair of parallel walls 701 spanned by a plurality of flow controlling walls 703 each having a valve 112. Valve 112 may be, for example, a flapper valve or door the generally permits water to flow in one direction, as indicated by the arrow F. Water transport apparatus 700 also includes a flexible material, such as canvas, indicated as material 712 and 714. Thus, for example, the pair of parallel walls 701 and the pair of adjacent walls 703 form a unit 710.

Walls 701 and 703 are generally fixed and not flexible, and mechanism 310 is attached to the bottom flexible material (such as material 712 or 714). Mechanisms 310 permit the flexible material of alternate units 710 to float up and down, thus permitting the average height of water to either move up with the tide (as in unit 713) or to stay at the low tide level (as in unit 714). The overall operation of water transport apparatus 700 is similar to that of water transport apparatus 100, in that water flows from one unit 710 to the downstream unit at each high tide.

In certain embodiments, water transport apparatus 700 may include a grid of a rigid material in each unit 710 to assist in supporting support the flexible material.

FIGS. 8A and 8B illustrate a top view and a side view, respectively, of another alternative embodiment water transport apparatus 800, which is generally similar to water transport apparatus 700, except as explicitly discussed subsequently.

Water transport apparatus 800 includes a mesh, or grid 810 that is attached to walls 701 and 703. Flexible material, such as material 812 and 814, which is similar to material 712 and 714 is attached to mechanism 310 and is supported or attached to grid 810 and walls 701 and 703. Mechanisms 310 permit the flexible material of alternate units 710 to float up and down, thus permitting the average height of water to either move up with the tide (as in unit 813) or to stay at the low tide level (as in unit 814).

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention.

I claim:

1. A method for transporting fresh water in a flow direction in an apparatus in the sea utilizing tidal power, the tidal power derived from tides consisting of a cycle of alternating local high tides and local low tides, the local high tides and local low tides comprising a known range of sea water depths at a single specific geographic locality, the method comprising:

providing a plurality of buoyant units configured to float in the sea, each buoyant unit including a flexible bottom attached to rigid side walls to contain the fresh water, the plurality of buoyant units arranged to define the flow direction;

wherein each of the plurality of buoyant units includes an anchoring mechanism configured to selectably constrain the flexible bottom at a height above the sea floor corresponding to the sea water depth at a selected local low tide;

wherein the anchoring mechanism includes: a timer, a cable, a housing, an anchoring block, and a latching mechanism;

wherein the housing and latching mechanism are configured to rest on the sea floor;

wherein the cable is attached to the flexible bottom at one end and the cable is attached to the anchoring block at the other end;

wherein the anchoring block is within the housing and the anchoring block is configured to sit at the bottom of the housing during the local low tide;

wherein the anchoring block includes an anchoring hole configured to interact with a bolt of the latching mechanism;

wherein the timer is configured to control the latching mechanism based on the local tide schedule;

wherein the latching mechanism is configured to selectably insert the bolt into the anchoring hole during the selected local low tide and maintain the bolt in the anchoring hole while the sea level rises to the subsequent local high tide and then falls to the subsequent local low tide;

wherein the latching mechanism is configured to selectably remove the bolt from the anchoring hole during the selected local low tide;

wherein when the bolt is not within the anchoring hole, the anchoring block is configured to be pulled up by the buoyant unit to the top of the housing during the rise of the sea level to the subsequent local high tide, and subsequently the anchoring block sinks to the bottom of the housing during the fall of the sea level to the subsequent local low tide;

wherein the flow direction describes relative positions of individual buoyant units to neighboring individual buoyant units as an upstream buoyant unit and a downstream buoyant unit;

wherein each of the plurality of buoyant units includes a one way valve, configured to allow the fresh water within the upstream buoyant unit to flow out of the upstream buoyant unit and into the downstream buoyant unit by force of gravity, the one way valve configured to prevent fresh water flow from the downstream buoyant unit to the upstream buoyant unit;

wherein the plurality of buoyant units are divided into two alternating groups consisting of a first plurality of buoyant units alternating with a second plurality of buoyant units in the flow direction;

wherein the method further follows a repeating sequence of:

providing fresh water within the first plurality of buoyant units;

during the selected local low tide, the timer activates all of the latching mechanisms of the first plurality of buoyant units to ensure removal of each bolt of the first plurality of buoyant units from each anchoring hole of the first plurality of buoyant units; simultaneously the timer also activates all of the latching mechanisms of the second plurality of buoyant units to ensure insertion of each bolt of the second plurality of buoyant units into each anchoring hole of the second plurality of buoyant units;

during the rise of the sea level to the subsequent local high tide immediately following the selected local low tide, each flexible bottom of the first plurality of buoyant units rise with the rising sea level due to the buoyancy of the first plurality of buoyant units, simultaneously each flexible bottom of the second plurality of buoyant units remain constrained at a height above the sea floor corresponding to the sea water depth during the selected local low tide, as a result of the differing heights of flexible bottoms between the first plurality of buoyant units and the second plurality of buoyant units, the fresh water contained within the first plurality of buoyant units flows by the force of gravity through each respective one way valve of the first plurality of buoyant units along the flow direction into the second plurality of buoyant units;

during the subsequent local low tide, the timer activates all of the latching mechanisms of the first plurality of buoyant units to ensure insertion of each bolt of the first plurality of buoyant units into each anchoring hole of the first plurality of buoyant units; simultaneously the timer also activates all of the latching mechanisms of the second plurality of buoyant units to ensure removal of each bolt of the second plurality of buoyant units from each anchoring hole of the second plurality of buoyant units;

during the rise of the sea level to the next local high tide each flexible bottom of the second plurality of buoyant units rise with the rising sea level due to the buoyancy of the second plurality of buoyant units, simultaneously each flexible bottom of the first plurality of buoyant units remain constrained at a height above the sea floor corresponding to the sea water depth during the selected local low tide, as a result of the differing heights of flexible bottoms between the first plurality of buoyant units and the second plurality of buoyant units, the fresh water contained within the second plurality of buoyant units flows by the force of gravity through each respective one way valve of the second plurality of buoyant units in the flow direction into the first plurality of buoyant units.

2. A method for transporting fresh water in a flow direction in an apparatus in a sea utilizing tidal power, the tides consisting of a cycle of alternating local high tides and local low tides, the local high tides and the local low tides comprising a known range of sea water depths at a single specific geographic locality, the method comprising:

providing a plurality of buoyant units configured to float in sea water, each buoyant unit comprises rigid side walls, and each buoyant unit is configured to contain fresh water, the plurality of buoyant units arranged to define the flow direction;

wherein the anchoring mechanism is configured to selectively restrain members of the plurality of buoyant units at a height above the sea floor corresponding to the sea water depth at a selected local low tide;

wherein the anchoring mechanism is configured to selectively restrain members of the plurality of buoyant units against buoyantly rising with the sea while the sea level rises to the subsequent local high tide and then falls to the subsequent local low tide;

wherein the anchoring mechanism is configured to selectively release restraints from select members of the plurality of buoyant units during the selected local low tide, thereby allowing select members of the plurality of buoyant units to buoyantly rise with the sea while the sea level rises to the subsequent local high tide and then buoyantly fall with the sea while the sea level falls to the subsequent low tide;

wherein the flow direction describes relative positions of individual buoyant units to neighboring individual buoyant units as an upstream buoyant unit and a downstream buoyant unit;

wherein each of the plurality of buoyant units includes a one way valve configured to allow fresh water within the upstream buoyant unit to flow out of the upstream buoyant unit and into the downstream buoyant unit by force of gravity, the one way valve configured to prevent fresh water flow from the downstream buoyant unit to the upstream buoyant unit;

wherein the plurality of buoyant units are divided into two groups consisting of a first plurality of buoyant units alternating with a second plurality of buoyant units in the flow direction;

wherein the method further follows a repeating sequence of:

providing fresh water within the first plurality of buoyant units;

during the selected local low tide, the anchoring mechanism releases the first plurality of buoyant units in order to allow the first plurality of buoyant units to buoyantly rise with the sea; simultaneously the anchoring mechanism also restrains the second plurality of buoyant units against buoyantly rising with the sea;

during the rise of the sea level to the subsequent local high tide immediately following the selected local low tide, the first plurality of buoyant units rise with the rising sea level due to the buoyancy of the first plurality of buoyant units, simultaneously the second plurality of buoyant units remain constrained at a height above the sea floor corresponding to the sea water depth during the selected local low tide, as a result of the greater heights above the sea floor of fresh water within the first plurality of buoyant units above the lesser heights above the sea floor of fresh water within the second plurality of buoyant units, the fresh water contained within the first plurality of buoyant units flows by the force of gravity through each respective one way valve of the first plurality of buoyant units in the flow direction into the second plurality of buoyant units;

during the subsequent local low tide, the anchoring mechanism releases the second plurality of buoyant units in order to allow the second plurality of buoyant units to buoyantly rise with the sea; simultaneously the anchoring mechanism also restrains the first plurality of buoyant units against buoyantly rising with the sea;

during the rise of the sea level to the next local high tide the second plurality of buoyant units rise with the rising sea level due to the buoyancy of the second plurality of buoyant units, simultaneously the first plurality of buoyant units remain constrained at a height above the sea floor corresponding to the sea water depth during the selected local low tide, as a result of the greater heights above the sea floor of fresh water within the second plurality of buoyant units above the lesser heights above the sea floor of fresh water within the first plurality of buoyant units, the fresh water contained within the second plurality of buoyant units flows by the force of gravity through each respective one way valve of the second plurality of buoyant units in the flow direction into the first plurality of buoyant units.

* * * * *